US011099017B2

(12) United States Patent
Zhang et al.

(10) Patent No.: US 11,099,017 B2
(45) Date of Patent: Aug. 24, 2021

(54) DETERMINING DRIVING PATHS FOR AUTONOMOUS DRIVING VEHICLES BASED ON OFFSET POINTS

(71) Applicant: Baidu USA LLC, Sunnyvale, CA (US)

(72) Inventors: Liangliang Zhang, San Jose, CA (US); Li Dong, Sunnyvale, CA (US); Fan Zhu, Sunnyvale, CA (US); Yifei Jiang, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 34 days.

(21) Appl. No.: 15/896,053

(22) Filed: Feb. 13, 2018

(65) Prior Publication Data

US 2019/0250000 A1  Aug. 15, 2019

(51) Int. Cl.
*G05D 1/02* (2020.01)
*G05D 1/00* (2006.01)
*G06K 9/00* (2006.01)
*B60W 10/20* (2006.01)
*B60W 30/12* (2020.01)
*B60W 40/072* (2012.01)
*G01C 21/28* (2006.01)
*G01C 21/36* (2006.01)
*G06T 7/73* (2017.01)
*G01C 21/34* (2006.01)

(52) U.S. Cl.
CPC ..... *G01C 21/3415* (2013.01); *G01C 21/3446* (2013.01); *G05D 1/0088* (2013.01); *G05D 1/021* (2013.01); *G05D 2201/0213* (2013.01)

(58) Field of Classification Search
None
See application file for complete search history.

(56) References Cited

U.S. PATENT DOCUMENTS

| 10,317,903 | B2* | 6/2019 | Shashua | G05D 1/0088 |
| 2018/0024562 | A1* | 1/2018 | Bellaiche | G01S 19/48 |
| | | | | 701/26 |
| 2018/0074505 | A1* | 3/2018 | Lv | B60W 30/12 |
| 2018/0099667 | A1* | 4/2018 | Abe | B60W 10/20 |
| 2018/0129203 | A1* | 5/2018 | Tafti | G05D 1/0005 |
| 2018/0129214 | A1* | 5/2018 | During | B60W 30/095 |
| 2019/0086930 | A1* | 3/2019 | Fan | G05D 1/0223 |

* cited by examiner

*Primary Examiner* — Adam D Tissot
*Assistant Examiner* — Laura E Linhardt
(74) *Attorney, Agent, or Firm* — Womble Bond Dickinson (US) LLP

(57) ABSTRACT

A first reference line representing a route from a first location to a second location associated with an autonomous driving vehicle (ADV). In response to the first reference line multiple sets of sample points are generated based on the first reference line. Each set of sample points includes a first subset of sample points and a second subset of sample points that are offset from the first subset of sample points. A plurality of segments is generated between the multiple sets of sample points. A path for the ADV is generated based on the plurality of segments. The path includes one sample point from each of the multiple sets of sample points.

20 Claims, 11 Drawing Sheets

DETERMINING DRIVING PATHS FOR AUTONOMOUS DRIVING VEHICLES BASED ON OFFSET POINTS

TECHNICAL FIELD

Embodiments of the present disclosure relate generally to operating autonomous driving vehicles. More particularly, embodiments of the disclosure relate to determining paths or routes for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Particularly, trajectory planning is a critical component in an autonomous driving system. Conventional trajectory planning techniques rely heavily on high-quality reference lines, which are guidance paths, e.g., a center line of a road, for autonomous driving vehicles, to generate stable trajectories. Usually, the map data (typically a sequence of two-dimensional (2D) points in the world frame) directly from sensors cannot provide the required smoothness, and therefore directly using the map data may cause the planners generating unstable and oscillating trajectories between planning cycles.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment may be included in at least one embodiment of the disclosure. The appearances of the phrase "in one embodiment" in various places in the specification do not necessarily all refer to the same embodiment.

According to some embodiments, a new method for determining a path for an autonomous driving vehicle (ADV) is utilized. Sets of sample points may be generated based on a reference line. Each set of sample points may include multiple subsets of sample points. The subsets of sample points (in each set of sample points) may be offset from each other in a direction parallel to the reference line. A plurality of segments may be generated between the sets of sample points. Each segment of the plurality of segments may be modeled or represented using a polynomial function. A cost for each segment may be determined based on various factors. A path with the minimum total cost may be determined based on the costs for the plurality of segments.

In some embodiments, offsetting the sample points may allow the ADV to avoid issues or problems with determining a path when the sample points are located at a boundary between two reference line segments, as discussed in more detail below. In some embodiments, the ADV may be able to avoid these issues or problems without generating additional sample points or additional sets of sample points, which may decrease the amount of computation time or the computational complexity of determining a path. In other embodiments, offsetting the sample points may change the curvatures and/or curvature change rates at the sample points which may allow for more or different options, variations, choices, etc., when determining a path for the ADV.

Figure 1:
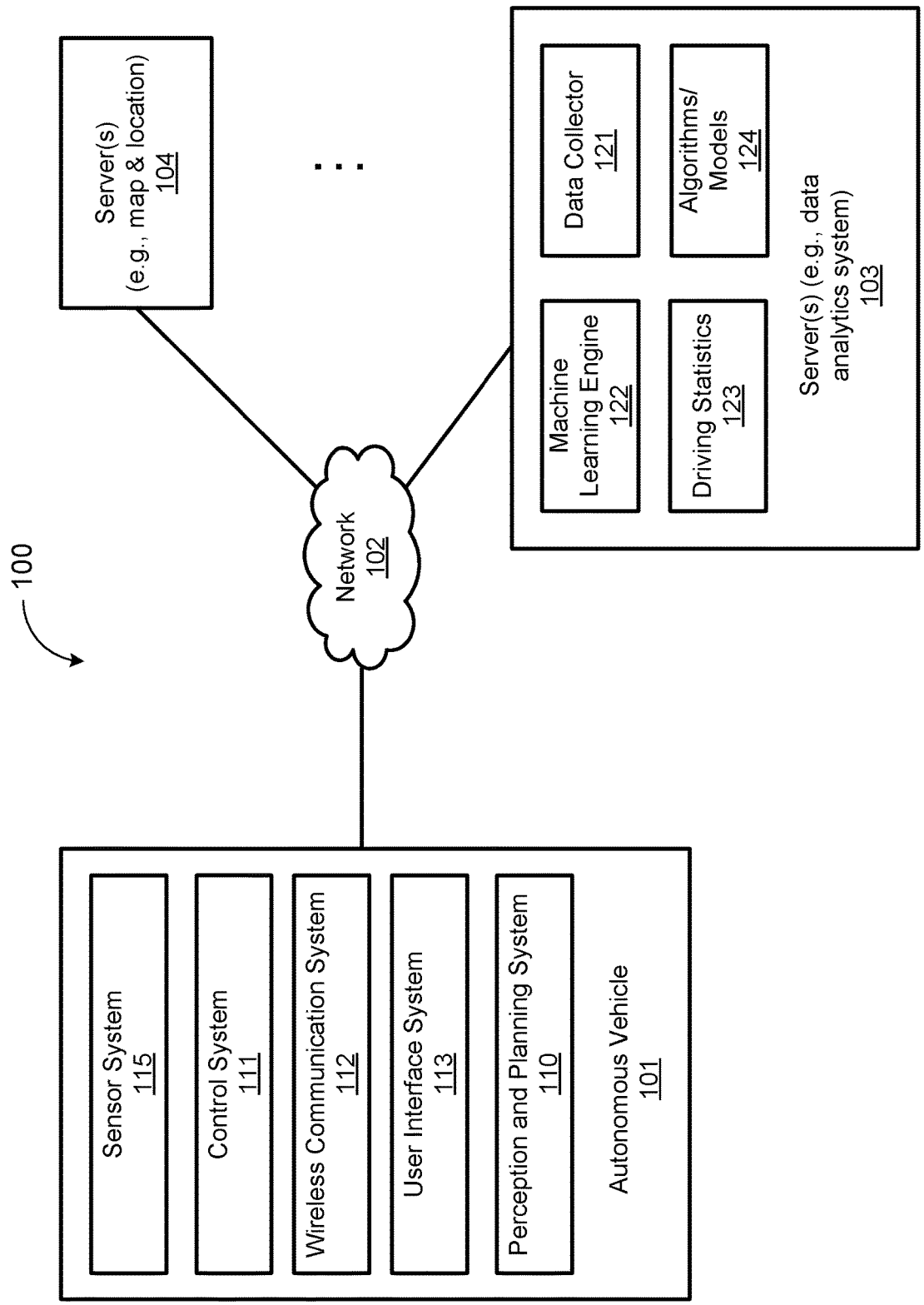
FIG. 1 is a block diagram illustrating a networked system according to some embodiments.

FIG. 1 is a block diagram illustrating an autonomous vehicle network configuration according to some embodiments of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles may be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that may be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
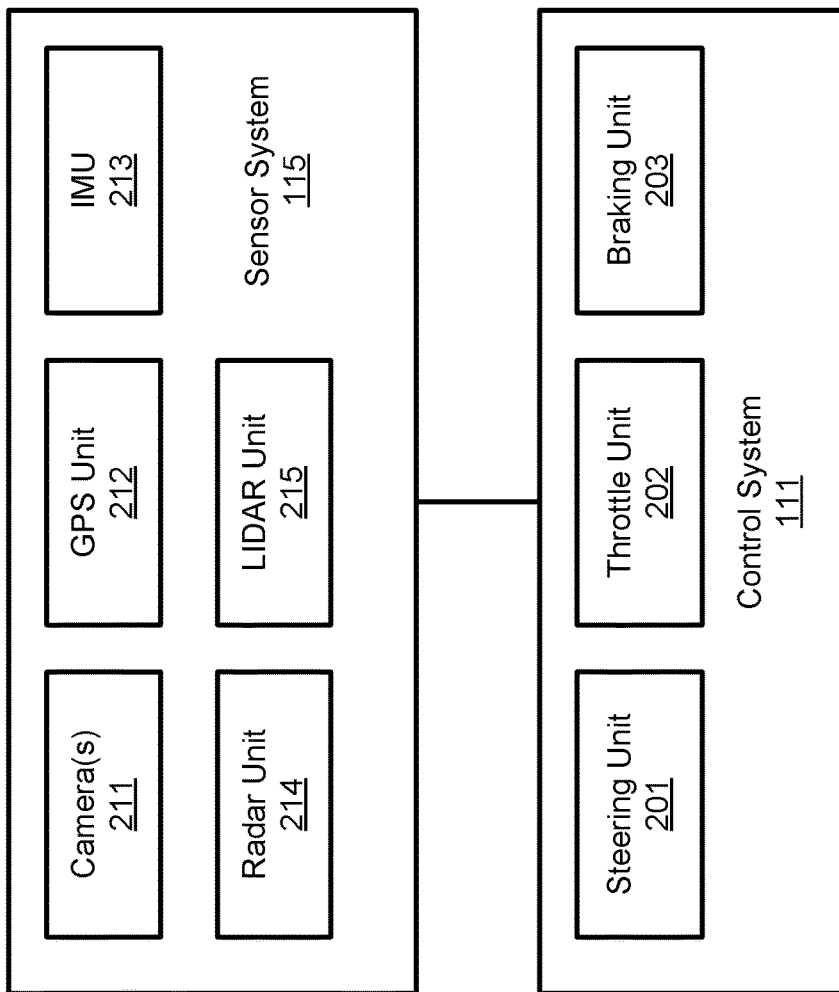
FIG. 2 is a block diagram illustrating an example of an autonomous vehicle according to some embodiments.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, a set of quintic polynomial functions may be selected and defined with initial coefficients or parameters. Furthermore, a set of constraints may also be defined based on the hardware characteristics such as sensors specification and specific vehicle designs, which may obtained from the driving statistics 123.

Figure 3A:
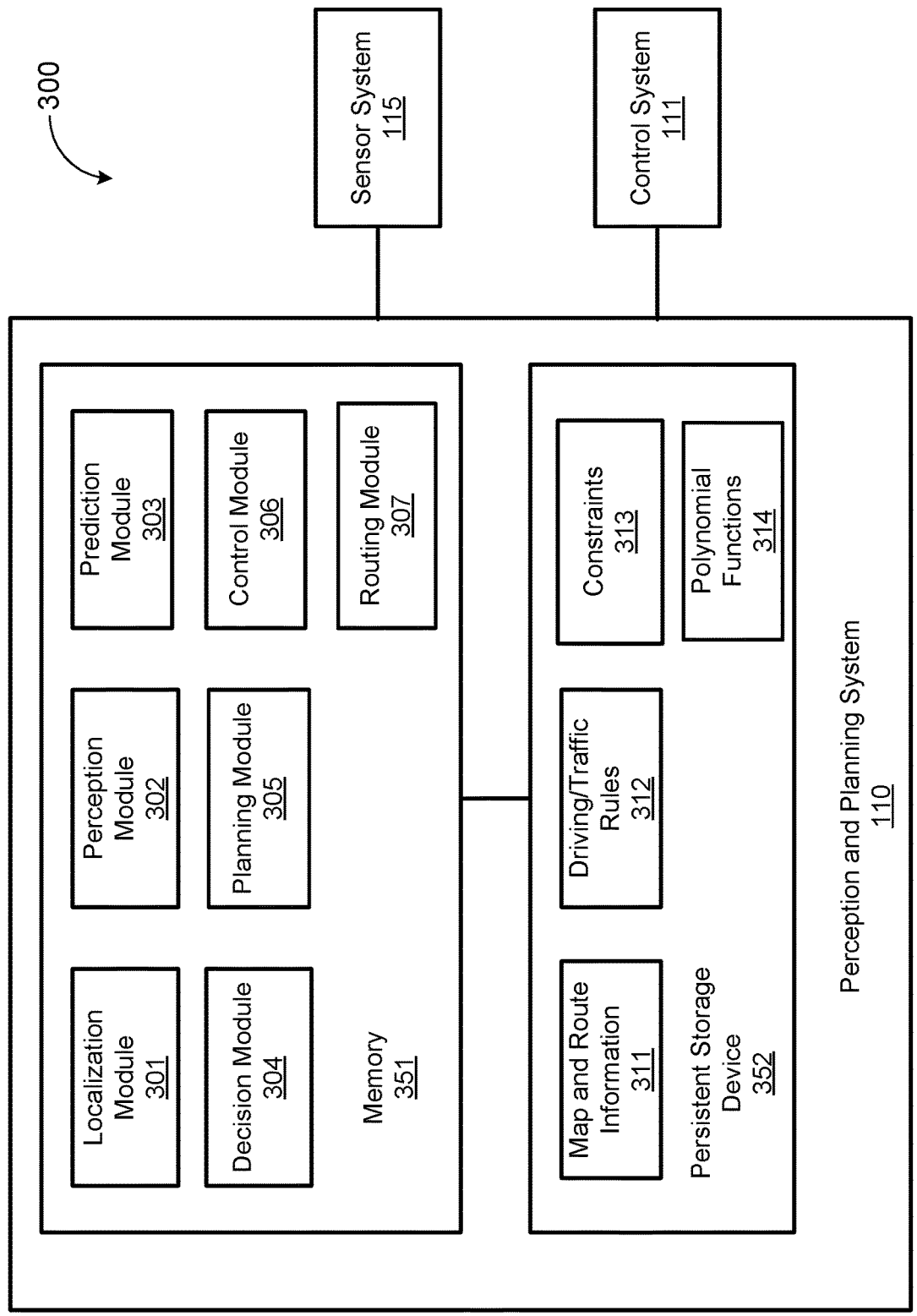
FIGS. 3A-3B are block diagrams illustrating an example of a perception and planning system used with an autonomous vehicle according to some embodiments.
Figure 3B:
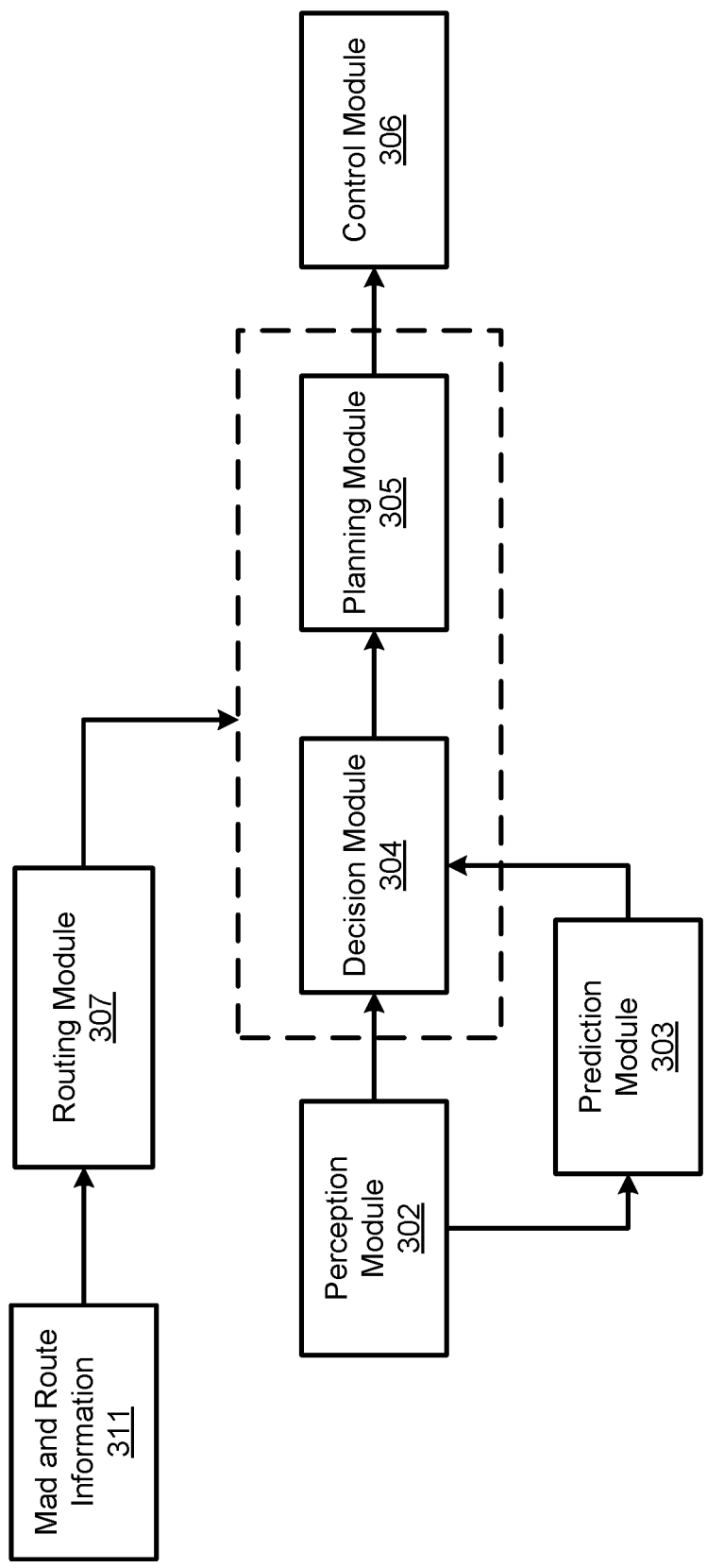

FIGS. 3A and 3B are block diagrams illustrating an example of a perception and planning system used with an autonomous vehicle according to some embodiments. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 can generate reference routes, for example, from map information such as information of road segments, vehicular lanes of road segments, and distances from lanes to curb. For example, a road may be divided into sections or segments {A, B, and C} to denote three road segments. Three lanes of road segment A may be enumerated {A1, A2, and A3}. A reference route is generated by generating reference points along the reference route. For example, for a vehicular lane, routing module 307 can connect midpoints of two opposing curbs or extremities of the vehicular lane provided by a map data. Based on the midpoints and machine learning data representing collected data points of vehicles previously driven on the vehicular lane at different points in time, routing module 307 can calculate the reference points by selecting a subset of the collected data points within a predetermined proximity of the vehicular lane and applying a smoothing function to the midpoints in view of the subset of collected data points.

Based on reference points or lane reference points, routing module 307 may generate a reference line by interpolating the reference points such that the generated reference line is used as a reference line for controlling ADVs on the vehicular lane. In some embodiments, a reference points table and a road segments table representing the reference lines are downloaded in real-time to ADVs such that the ADVs can generate reference lines based on the ADVs' geographical location and driving direction. For example, in one embodiment, an ADV can generate a reference line by requesting routing service for a path segment by a path segment identifier representing an upcoming road section ahead and/or based on the ADV's GPS location. Based on a path segment identifier, a routing service can return to the ADV reference points table containing reference points for all lanes of road segments of interest. ADV can look up reference points for a lane for a path segment to generate a reference line for controlling the ADV on the vehicular lane.

Figure 4:
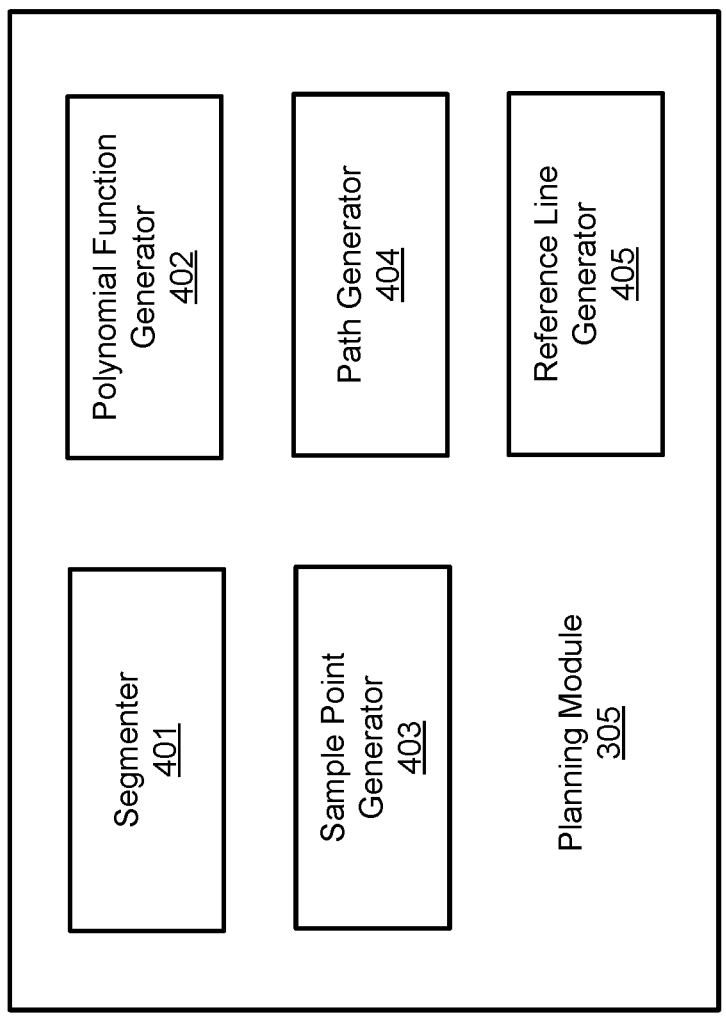
FIG. 4 is a block diagram illustrating an example of a planning module according to some embodiments.

FIG. 4 is a block diagram illustrating an example of a planning module 305 according to some embodiments. Referring to FIG. 4, planning module 305 includes, but is not limited to, a segmenter 401, a quintic function generator 402, a sample point generator 403, a path generator 404, and a reference line generator 405. These modules 401-405 may be implemented in software, hardware, or a combination thereof. Reference line generator 405 is configured to generate a reference line for the ADV. As discussed above, the reference line may be a guidance path, e.g., a center line of a road, for the ADV, to generate stable trajectories. The reference line generator 405 may generate the reference line based on map and route information 311 (illustrated in FIGS. 3A and 3B). Segmenter 401 is configured to segment the reference line into a number of reference line segments. The reference line may be divided into reference line segments to generate discrete segments or portions of the reference line. For each of the reference line segments, polynomial function generator 402 may be configured to define and generate a polynomial function to represent or model the corresponding reference line segment. The sample point generator 403 may generate sample points based on the reference line. For example, the sample point generator 403 may generate one or more sets of sample points (e.g., groups of one or more sample points) that are may generally follow the reference line, as discussed in more detail below. Each set of sample points may include a first subset of sample points and a second subset of sample points, as discussed in more detail below.

The polynomial function generator 402 may connect the multiple sets of sample points to each other. For example, the polynomial function generator 402 may generate one or more segments (e.g., connections) between each sample point in a set of sample points and each sample in the next adjacent set of sample points, as discussed in more detail below. The polynomial function generator 402 may also generate, calculate, determine, etc., one or more polynomials that may be used to represent the segments between the sample points. For example, the polynomial function generator 402 may generate, determine, calculate, etc., a polynomial function for each segment between two sample points. The polynomial functions that represent the segments may also be generated, determined, calculated based on various boundaries or constraints. The boundaries or constraints may be preconfigured and/or stored as a part of constraints 313 illustrated in FIG. 3A. The polynomial functions used by the planning module 305 (e.g., used by the polynomial function generator 402) may be preconfigured and/or stored as a part of functions polynomial functions 314 illustrated in FIG. 3A.

The path generator 404 may determine a path for the ADV based on the segments between the sample points, as discussed in more detail below. For example, the path generator 404 may determine a cost for each segment. The cost may be based on various factors or parameters including, but not limited to, how far away the segment is from the reference line, how far away the sample points in the segment are from the reference line, the curvature change rate for a segment or for sample points in the segment, the curvature of a segment, obstacles (e.g., a vehicle, a pedestrian, an obstruction, etc.) that may be located at a sample point, etc. The costs may also be referred to as weights. The path generator 404 may identify or select the segments that form a path which has the lowest total cost (lowest total weight).

Figure 5A:
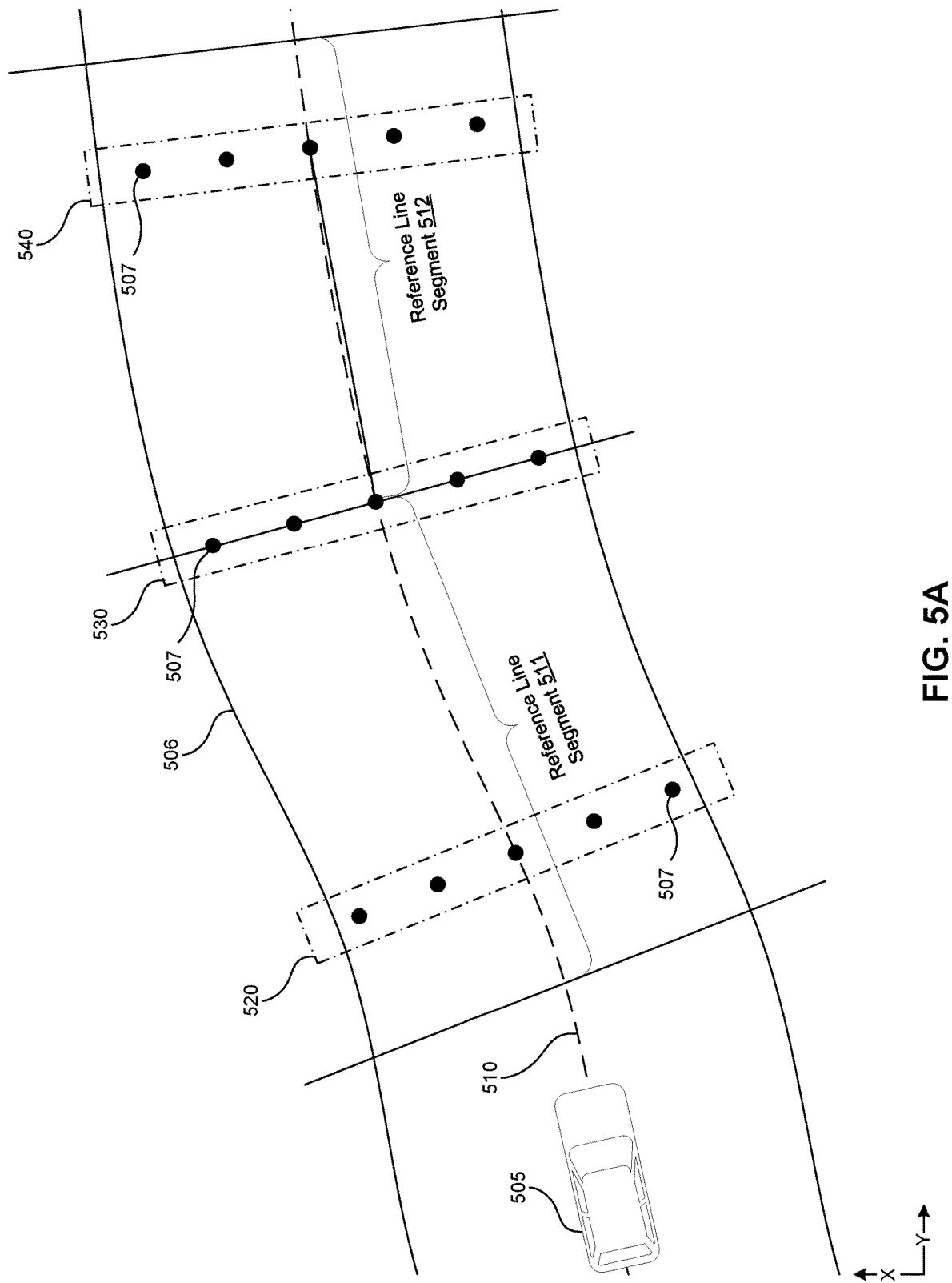
FIG. 5A is a diagram illustrating an example of an autonomous vehicle traveling down a road according to some embodiments.

FIG. 5A is a diagram illustrating an example of an ADV 505 traveling (e.g., moving, driving, etc.) down a road 506 (e.g., a street, a lane, a highway, a freeway, an expressway, etc.) according to some embodiments. As discussed above, reference line generator 405 (illustrated in FIG. 4) may generate a reference line 510. The reference line 510 may be a guidance path, e.g., a center line of the road 506 for the ADV 505. Also as discussed above, segmenter 401 (illustrated in FIG. 4) may segment (e.g., divide, split, etc.) the reference line 510 into reference line segment 511 and reference line segment 512. The sample point generator 503 may generate sample points 507 (illustrated by the black dots in FIG. 5A), as discussed above. The sample points may be grouped into groups or sets of sample points. As illustrated in FIG. 5A, the sample points 507 are grouped into three sets of sample points, set 520, set 530, and set 540. The road 506, the sample points, the reference line 510, and/or other elements illustrated in FIG. 5 may be represented using a Cartesian coordinate system as illustrated by the X axis and Y-axis in FIG. 5A. For example, the location of the ADV 505 may be represented using an X-Y coordinate. In another example, a sample point 507 may be represented using an X-Y coordinate. Although FIG. 5A (and/or FIG. 5B) illustrates two reference line segments 511 and 512, fifteen sample points 507, and sets 520, 530, and 520, different numbers of reference line segments, different numbers of sample points, different numbers of sets, different number of sample points in sets, different positions of sample points may be used in other embodiments.

In one embodiment, the reference line 510 may be represented using one or more polynomial functions. For example, the polynomial function generator 402 may generate a polynomial function that may represent reference line segment 511 and a polynomial function that may represent reference line segment 512 (e.g., the reference line segments 511 and 512 may be modeled using polynomial functions). The polynomial function generator 402 may generate one polynomial function for each reference line segment. For each of the reference line segments 511 and 512, polynomial function generator 402 may generate a polynomial function $\theta(s)$. In one embodiment, each polynomial function represents a direction of a starting reference point of the corresponding reference line segment. A derivative (e.g., the first order derivative) of the polynomial function represents a curvature of the starting reference point of the reference line segment, $K=d\theta/ds$. A second order derivative of the polynomial function represents a curvature change or curvature change rate, $dK/ds$.

For the purpose of illustration, following terms are defined:

$\theta_0$: starting direction
$\dot{\theta}_0$: starting curvature, $\kappa$, direction derivative w.r.t. curve length, i.e., $$\frac{d\theta}{ds}$$

$\ddot{\theta}_0$: starting curvature derivative, i.e., $$\frac{d\kappa}{ds}$$

$\theta_1$: ending direction
$\dot{\theta}_1$: ending curvature
$\ddot{\theta}_1$: ending curvature derivative
$\Delta s$: the curve length between the two ends Each piecewise spiral path is decided by seven parameters: starting direction ($\theta 0$), starting curvature ($d\theta 0$), starting curvature derivative ($d2\theta 0$), ending direction ($\theta 1$), ending curvature ($d\theta 1$), ending curvature derivative ($d2\theta 1$) and the curve length between the starting and ending points ($\Delta s$). In one embodiment, the polynomial function may be a quintic polynomial function. A quintic polynomial function may be defined by equation (1) (e.g., a formula, a function, etc.) as follows:

$$\theta_i(s) = a*s^5 - b*s^4 + c*s^3 + d*s^2 + e*s + f \tag{1}$$

and it satisfies $$\theta_i(0) = \theta_i \tag{2}$$

$$\dot{\theta}_i(0) = \dot{\theta}_i \tag{3}$$

$$\ddot{\theta}_i(0) = \ddot{\theta}_i \tag{4}$$

$$\theta_i(\Delta s)=\theta_{i+1} \tag{5}$$

$$\dot{\theta}_i(\Delta s)=\dot{\theta}_{i+1} \tag{6}$$

$$\ddot{\theta}_i(\Delta s)=\ddot{\theta}_{i+1} \tag{7}$$

In another embodiment, the polynomial function may be a cubic polynomial. A cubic polynomial may be defined by equation (8) as follows:

$$\theta_i(s)=a*s^3+b*s^2+c*s+f \tag{8}$$

and the cubic polynomial may satisfy the same conditions (indicated above with respect to the quintic polynomial function) illustrated by equations (2) through (7).

Based on the above constraints, the optimization is performed on all polynomial functions of all reference line segments, such that the output of a polynomial function representing reference line segment (i) at zero segment length should be the same as or similar to a direction at the starting reference point of the corresponding reference line segment (i). A first order derivative of the polynomial function should be the same as or similar to a curvature at the starting reference point of the reference line segment (i). A second order derivative of the polynomial function should be the same as or similar to a curvature change rate at the starting reference point of the reference line segment (i). Similarly, the output of a polynomial function representing reference line segment (i) at the full segment length(s) should be the same as or similar to a direction at the starting reference point of the next reference line segment (i+1), which is the ending reference point of the current reference line segment (i). A first order derivative of the polynomial function should be the same as or similar to a curvature at the starting reference point of the next reference line segment (i+1). A second order derivative of the polynomial function should be the same as or similar to a curvature change rate at the starting reference point of the next reference line segment (i+1).

For example, for reference line segment 501 as shown in FIG. 5A, an output of the corresponding polynomial function θ(0) represents a direction or angle of a starting point of reference line segment 511. θ(Δs0) represents a direction of ending point of reference line segments 511, where the ending point of reference line segments 511 is also the starting point of the next reference line segment 511. A first order derivative of θ(0) represents a curvature at the starting point of reference line segment 511 and a second order derivative of θ(0) represents a curvature change rate at the ending point of reference line segment 511. A first order derivative of θ(s0) represents a curvature of the ending point of reference line segment 511 and a second order derivative of θ(s0) represents a curvature change rate of the ending point of reference line segment 511.

By substituting the above variables $\theta_i$, $\dot{\theta}_i$, $\ddot{\theta}_i$, $\theta_{i+1}$, $\dot{\theta}_{i+1}$, $\ddot{\theta}_{i+1}$, Δs in, there will be six equations that may be utilized to solve the coefficients of the polynomial function a, b, c, d, e, and f. For example, as stated above, the direction at a given point may be defined using the above quintic polynomial function:

$$\theta(s)=as^5+bs^4+cs^3+ds^2+es+f \tag{9}$$

The first order derivative of the quintic polynomial function represents a curvature at the point of the path:

$$d\theta=5as^4+4bs^3+3cs^2+2ds+e \tag{10}$$

The second order derivative of the quintic polynomial function represents a curvature change rate at the point of the path:

$$d^2\theta=20as^3+12bs^2+6cs+2d \tag{11}$$

For a given spiral path or reference line segment, there are two points involved: a starting point and an ending point, where the direction, curvature, and curvature change rate of each point may be represented by the above three equations respectively. Thus, there are a total of six equations for each spiral path or reference line segment. These six equations may be utilized to determine the coefficients a, b, c, d, e, and f of the corresponding quintic polynomial function.

When a spiral path is utilized to represent a curve between consecutive reference points in the Cartesian space, there is a need to build a connection or bridge between the spiral path curve length and a position in the Cartesian space. Given a spiral path $\theta_i(s)$ defined by $\{\theta_i, d\theta_i, d^2\theta_i, \theta_{i+1}, d\theta_{i+1}, d^2\theta_{i+1}, \Delta s\}$, and path starting point $p_i=(x_i, y_i)$, we need to determine the coordinate of point p=(x, y) given any s=[0, Δs]. In one embodiment, the coordinates of a given point may be obtained based on the following equations (e.g., formulas, functions, etc.):

$$x=x_i+\int_0^s \cos(\theta_i(s))ds \tag{12}$$

$$y=y_i+\int_0^s \sin(\theta_i(s))ds \tag{13}$$

When s=Δs, the ending coordinates pi+1 are obtained given curve θi and starting coordinates pi=(xi, yi). The optimization of the functions are performed such that the overall output of the functions of the spiral paths reach minimum, while the above set of constraints are satisfied. In addition, the coordinates of the terminal point derived from the optimization is required to be within a predetermined range (e.g., tolerance, error margins) with respect to the corresponding coordinates of the initial reference line. That is, the difference between each optimized point and the corresponding point of the initial reference line should be within a predetermined threshold.

Figure 5B:
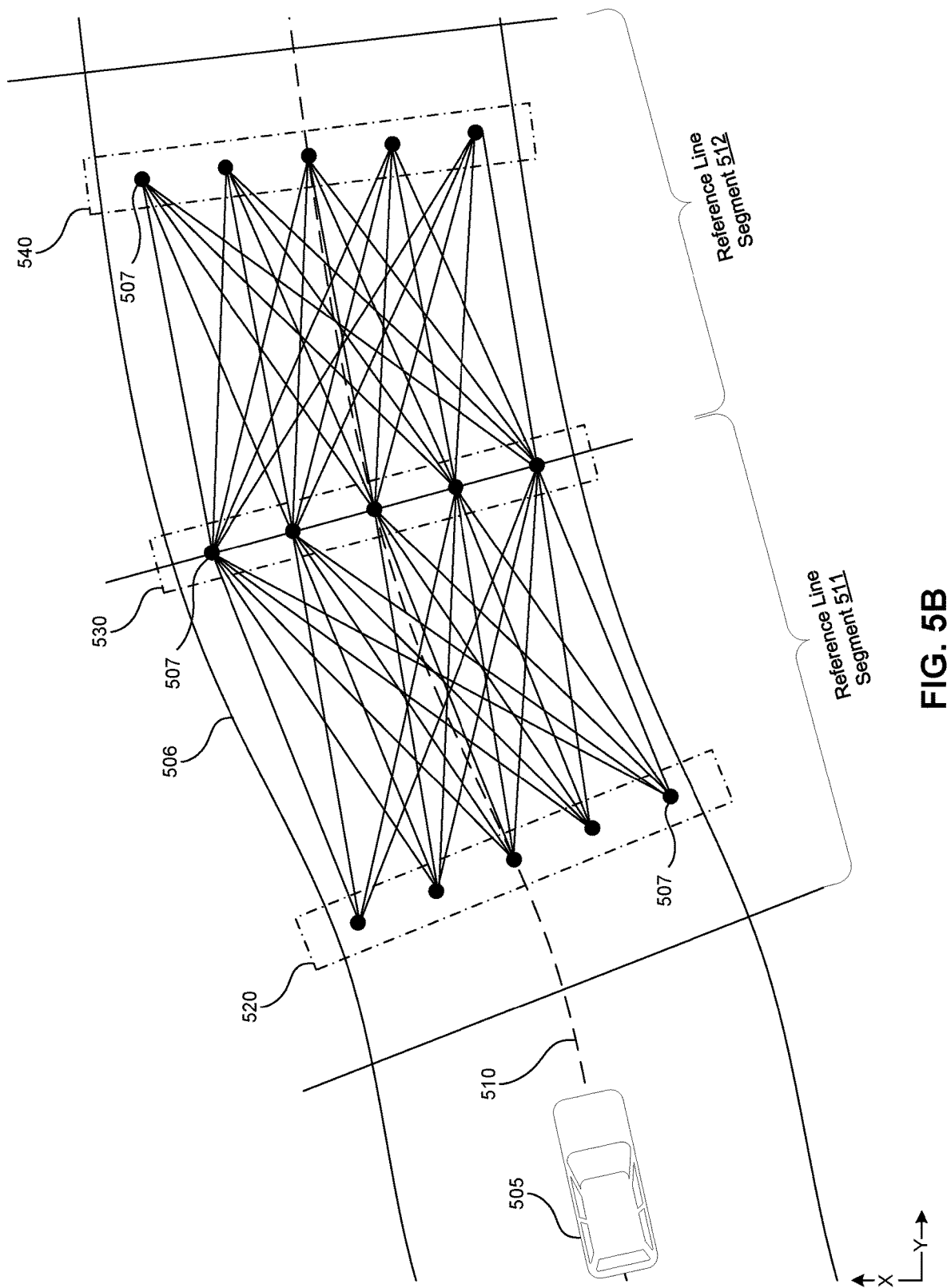
FIG. 5B is a diagram illustrating an example of an autonomous vehicle traveling down a road according to some embodiments.

FIG. 5B is a diagram illustrating an example of an ADV 505 traveling (e.g., moving, driving, etc.) down a road 506 (e.g., a street, a lane, a highway, a freeway, an expressway, etc.) according to some embodiments. As discussed above, reference line generator 405 (illustrated in FIG. 4) may generate a reference line 510. Also as discussed above, segmenter 401 (illustrated in FIG. 4) may segment the reference line 510 into reference line segment 511 and reference line segment 511. The sample point generator 503 may generate sample points 507, as discussed above. The sample points may be grouped into three sets of sample points, set 520, set 530, and set 540. The road 506, the sample points, the reference line 510, and/or other elements illustrated in FIG. 5 may be represented using a Cartesian coordinate system as illustrated by the X axis and Y-axis in FIG. 5B. The reference line 510 may be represented using one or more polynomial functions (e.g., one polynomial function for reference line segment 511 and one polynomial function for reference line segment 512), as discussed above. The polynomial functions (e.g., cubic polynomials, quintic polynomials) and the coefficients for the polynomial functions may be determined using equations (1) through (12), as discussed above.

In one embodiment, the polynomial function generator 402 may generate segments that connect the sample points of one set of sample points, to the sample points of an adjacent set of sample points, as discussed above. As illustrated by the lines between the sample points 507 in sets 520 and 530, the polynomial function generator 402 may generate segments that connect each sample point in set 520 to each sample point in set 530. For example, the polynomial function generator 402 may generate twenty-five segments that connect the five sample points 507 in set 520, to the five sample points 507 in set 530. The polynomial function generator 402 may also generate segments (e.g., twenty-five additional segments) that connect each sample point in set 530 to each sample point in set 540, as illustrated by the lines between sample points 507 in sets 530 and 540. In some embodiments, the polynomial function generator 402 may also generate, determine, calculate, etc., polynomial functions (e.g., quintic or cubic polynomial functions) to represent or model each of the segments using equations (1) through (12), as discussed above. For example, similar to the reference line segments 511 and 512, the polynomial function generator 402 may determine a polynomial function and coefficients for the polynomial function for each segment (e.g., for each of the fifty segments illustrated in FIG. 5B).

In one embodiment, the path generator 404 may determine a path for the ADV 505 based on the segments between the sample points, as discussed in more detail below. The path generator 404 may determine a cost (e.g., a weight) for each of the fifty segments. The cost may be based on various factors or parameters including, but not limited to, how far away the segment is from the reference line, how far away the sample points in the segment are from the reference line, the curvature of a segment, the curvature at a sample point, the curvature at a starting point and/or ending point of a segment, the curvature change rate for a segment, the curvature change rate at a sample point, the curvature change rate at a starting point and/or an endpoint of a segment, obstacles that may be located at a sample point, etc. The path generator 404 may identify or select the segments that form a path through multiple sets of segments which also have the lowest total cost (lowest total weight).

As illustrated in FIG. 5B, the sample points 507 in the set 530 are located at the boundary of reference line segments 511 and 512. The distance between the sets 520, 530, and 540 (e.g., the distance along the reference line 510) may be determined based on the speed of the ADV 605. Thus, there may be instances or situations where the speed of the ADV 505 may result in the sample points being located at the boundary of reference line segments. Because the sample points 507 are located at the boundary of reference line segments 511 and 512, the cost of the segments that lead to (e.g., end at) the sample points 507 in the set 530 and the cost of the segments that originate from (e.g., start from) the sample points 507 in the set 530 may cause those segments to be unusable by the path generator 404. For example, because the sample points 507 in the set 530 are located at the boundary of reference line segments 511 and 512, a derivative for the polynomial functions that represent the segments that include those sample points may not exist because the polynomial function may not be continuous at the boundary. Thus, the path generator 404 may be unable to determine a path for the ADV 505 if the sample points 507 in a set are located on a boundary between two segments of the reference line 510.

Figure 6A:
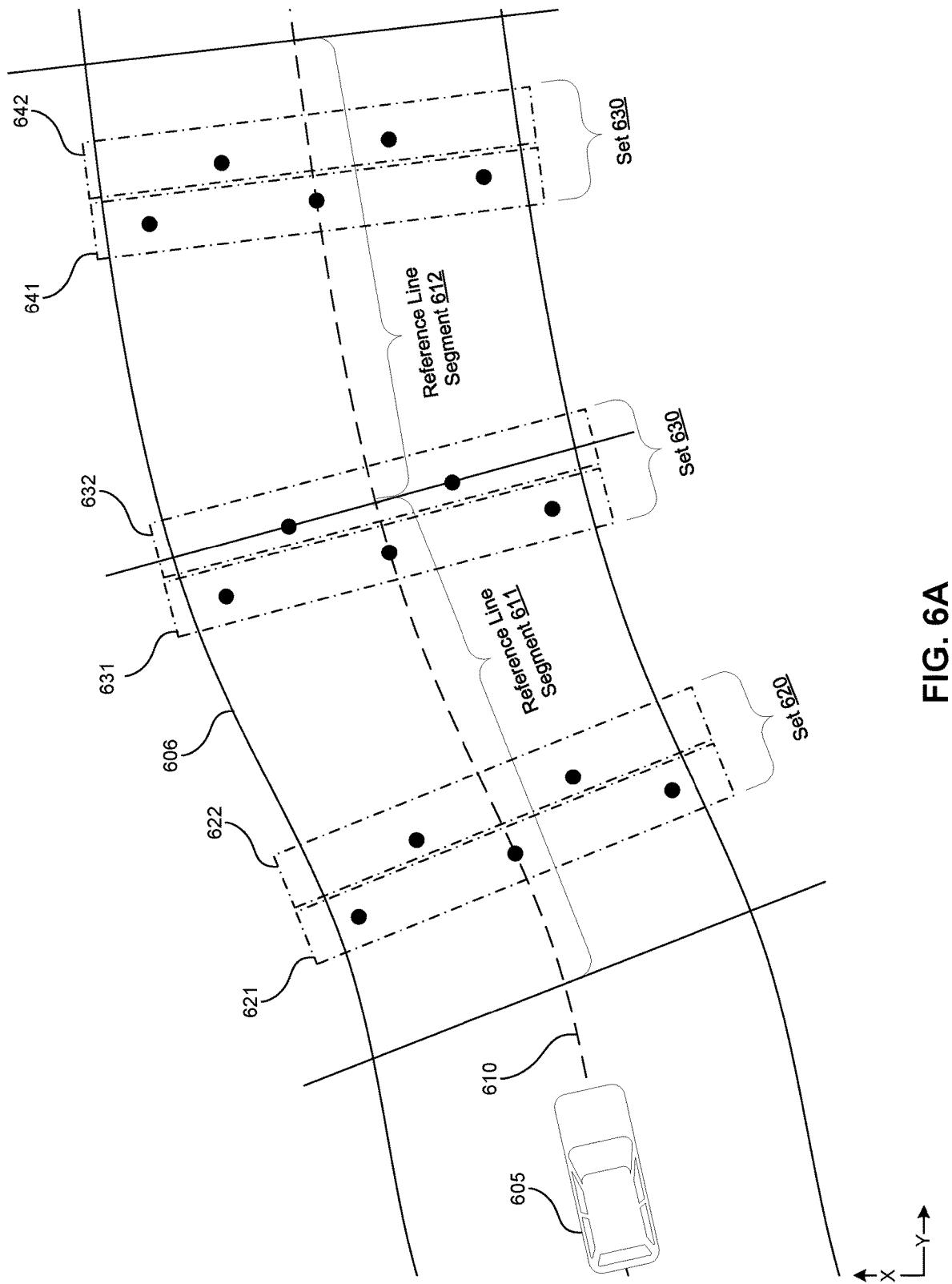
FIG. 6A is a diagram illustrating an example of an autonomous vehicle traveling down a road according to some embodiments.

FIG. 6A is a diagram illustrating an example of an ADV 605 traveling (e.g., moving, driving, etc.) down a road 605 (e.g., a street, a lane, a highway, a freeway, an expressway, etc.) according to some embodiments. As discussed above, reference line generator 406 (illustrated in FIG. 4) may generate a reference line 610. Also as discussed above, segmenter 401 (illustrated in FIG. 4) may segment the reference line 610 into reference line segment 611 and reference line segment 611. The sample point generator 603 may generate sample points 607, as discussed above. The sample points may be grouped into three sets of sample points, set 620, set 630, and set 640. Each set includes two subsets of sample points 607. Set 620 includes subset 621, and 622. Set 630 includes subset 631, and 632. Set 640 includes subset 641, and 642. Although FIG. 6A illustrates two subsets for each set, other embodiments may include more subsets for each set (e.g., may include three, four, or some other appropriate number of subsets).

In one embodiment, the subsets of sample points are offset, skewed, shifted, etc., from each other along the reference line 610. For example, the subsets (that are included in a set of sample points) may be shifted from each other in a longitudinal direction/axis (e.g., in a direction that is parallel to the reference line 610). As illustrated in FIG. 6A, subset 622 is shifted to the right of subset 621 along the reference line 610, subset 632 is shifted to the right of subset 631 along the reference line 610, and subset 642 is shifted to the right of subset 641 along the reference line 610.

In one embodiment, the distance between the sets 620, 630, and 640 may be based on the speed of the ADV 605. For example, the sample point generator 403 determine the distance between the sets 620, 630, and 640 based on the following equation:

$$\text{distance} = (\text{ADV\_speed} * \text{speed\_coefficient}) + \text{min\_dist} \quad (14)$$

where ADV_speed is the speed of the ADV 605, where speed_coefficient is a weight for the speed of the ADV 605, and where min_dist is a minimum distance between the sets 620, 630, and 640. In another embodiment, the distance between the subsets may be based on the speed of the ADV 605. For example, the sample point generator 403 may determine the distance between subset 621 and 622, between the subsets 631 and 632, between the subsets 641 and 642, etc., based on equation (14) illustrated above. The distance between the subsets may vary in different embodiments. For example, the distance between the subsets may be between two meters and three meters, or some other appropriate distance. The speed_coefficient and the min_dist may be configurable by a user and may allow the user to adjust the desired distance between the sets and/or subsets of sample points 607.

In one embodiment, the number of sample points in the first subset (of a set) may be less than or equal to the number of sample points in the second subset (of a set). For example, the number of sample points 607 in subset 622 (e.g., two sample points) is less than or equal to the number of sample points 607 in the subset 621 (e.g., three sample points). In another example, when there are an odd number of sample points in a set of sample points, one subset may have fewer sample points than the other subset. In a further example, when there is an even number of sample points in the set of sample points, both subsets may have the same number of sample points. In other embodiments, the subsets of sample points may have different numbers of sample points. For example, a first subset may have one third the number of sample points as a second subset. In some embodiments, the number of subsets in each set, and/or the positioning (e.g., spacing) of the sample points within each subset may be configurable by a user.

In one embodiment, the spacing between the sample points in a first subset may be less than or equal to the spacing between the sample points in a second subset. The spacing between the sample points may refer to the distance in a latitudinal direction/axis (e.g., in a direction that is perpendicular to the reference line 610). For example, referring to FIG. 6A, the spacing between the sample points in subset 621 may be smaller than the spacing between the sample points in subset 622. Various spacings may be used in other embodiments.

Figure 6B:
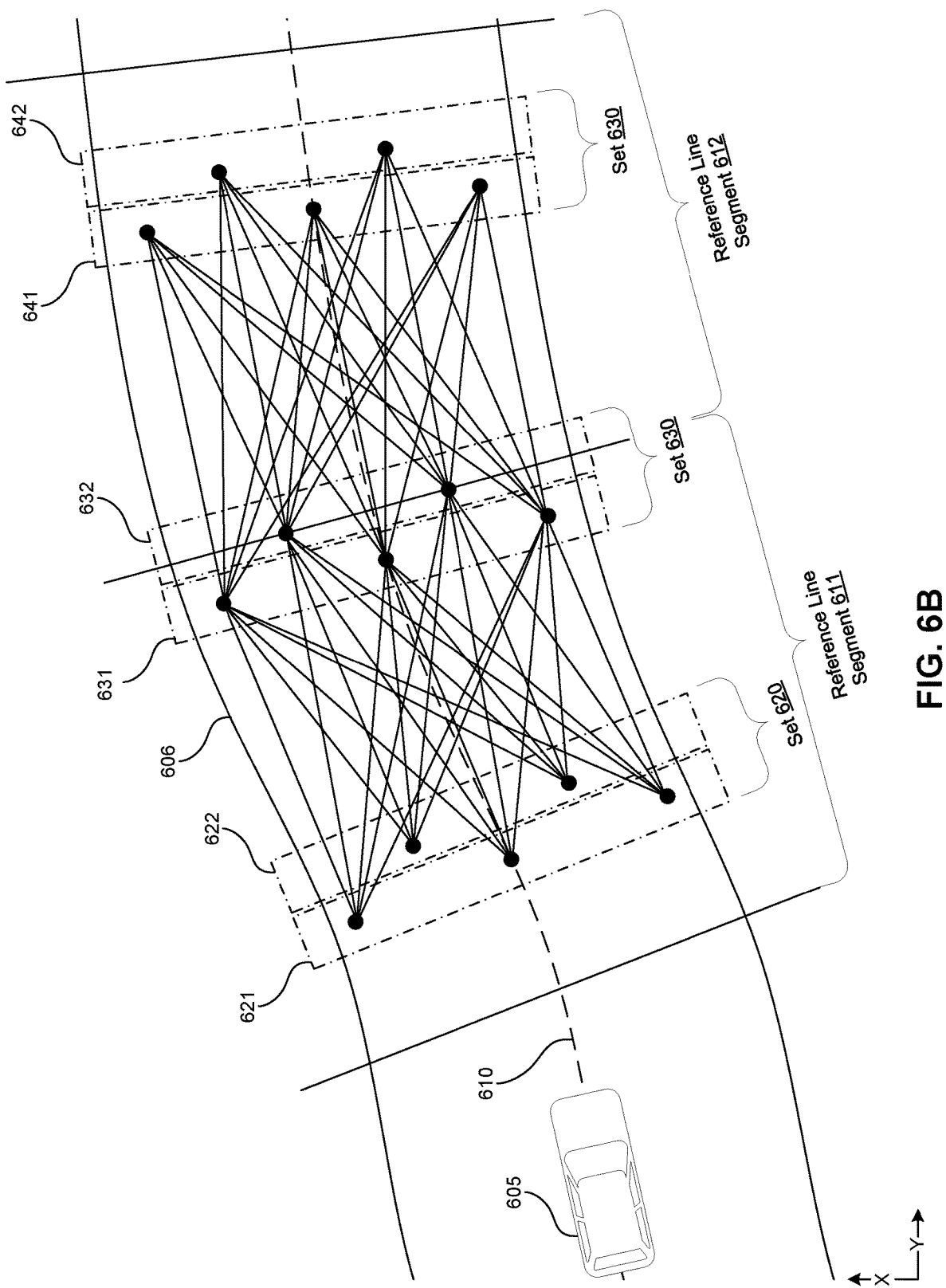
FIG. 6B is a diagram illustrating an example of an autonomous vehicle traveling down a road according to some embodiments.

The road 605, the sample points, the reference line 610, and/or other elements illustrated in FIG. 6 may be represented using a Cartesian coordinate system as illustrated by the X axis and Y-axis in FIG. 6B. The reference line 610 may be represented using one or more polynomial functions (e.g., one polynomial function for reference line segment 611 and one polynomial function for reference line segment 612), as discussed above. The polynomial functions (e.g., cubic polynomials, quintic polynomials) and the coefficients for the polynomial functions may be determined using equations (1) through (12), as discussed above.

FIG. 6B is a diagram illustrating an example of an ADV 605 traveling (e.g., moving, driving, etc.) down a road 605 (e.g., a street, a lane, a highway, a freeway, an expressway, etc.) according to some embodiments. As discussed above, reference line generator 406 (illustrated in FIG. 4) may generate a reference line 610. Also as discussed above, segmenter 401 (illustrated in FIG. 4) may segment the reference line 610 into reference line segment 611 and reference line segment 611. The sample point generator 603 may generate sample points 607, as discussed above. The sample points may be grouped into three sets of sample points, set 620, set 630, and set 640. Set 620 includes subset 621 and 622, set 630 includes subset 631 and 632, and set 640 includes subset 641 and 642, as discussed above. The distance between the subsets, the spacing between the sample points in the subsets, and the number of sample points in the subsets or sets may vary in different embodiments. Although FIG. 6B illustrates two subsets for each set, other embodiments may include more subsets for each set (e.g., may include three, four, or some other appropriate number of subsets). In some embodiments, the number of subsets in each set, and/or the positioning (e.g., spacing) of the sample points within each subset may be configurable by a user.

The road 605, the sample points, the reference line 610, and/or other elements illustrated in FIG. 6 may be represented using a Cartesian coordinate system as illustrated by the X axis and Y-axis in FIG. 6B. The reference line 610 may be represented using one or more polynomial functions (e.g., one polynomial function for reference line segment 611 and one polynomial function for reference line segment 612), as discussed above. The polynomial functions (e.g., cubic polynomials, quintic polynomials) and the coefficients for the polynomial functions may be determined using equations (1) through (12), as discussed above.

In one embodiment, the polynomial function generator 402 may generate segments that connect the sample points of one set of sample points, to the sample points of an adjacent set of sample points, as discussed above. As illustrated by the lines between the sample points 607 in sets 620 and 630, the polynomial function generator 402 may generate segments that connect each sample point in set 620 to each sample point in set 630 (e.g., may generate twenty-five segments), and may generate segments that connect each sample point in set 630 to each sample point in set 640 (e.g., may generate an additional twenty-five segments), as discussed above. In some embodiments, the polynomial function generator 402 may also generate, determine, calculate, etc., polynomial functions (e.g., quintic or cubic polynomial functions) to represent or model each of the segments using equations (1) through (12), as discussed above. For example, similar to the reference line segments 611 and 612, the polynomial function generator 402 may determine a polynomial function and coefficients for the polynomial function for each segment (e.g., for each of the fifty segments illustrated in FIG. 6B).

In one embodiment, the path generator 404 may determine a path for the ADV based on the segments between the sample points, as discussed in more detail below. The path generator 404 may determine a cost (e.g., a weight) for each of the fifty segments. As discussed above, the cost may be based on various factors or parameters including, but not limited to, how far away the segment is from the reference line, how far away the sample points in the segment are from the reference line, the curvature of a segment, the curvature at a sample point, the curvature at a starting point and/or ending point of a segment, the curvature change rate for a segment, the curvature change rate at a sample point, the curvature change rate at a starting point and/or an endpoint of a segment, any obstacles (e.g., other vehicles, pedestrians, obstructions, etc.) that may be located at a sample point, etc. The path generator 404 may identify or select the segments that form a path through multiple sets of segments which has the lowest total cost (lowest total weight).

In some embodiments, the path generator 404 may use dynamic programming algorithm, functions, operations, etc., to determine the path for the ADV 605. For example, the path generator 404 may use Dijkstra's algorithm to determine the path with the lowest cost for the ADV 605 based on the costs (e.g., the weights) of the segments. The path for the ADV may include one segment of the twenty-five segments between set 620 and 630, and one segment of the twenty-five segments between set 630 and set 640. If multiple paths have the same lowest cost, the path generator 404 may select one of the multiple paths based on various factors. For example, the path generator 404 may select the path that most closely follows the reference line 610 (e.g., the path that deviates the least from the reference line 610).

As illustrated in FIG. 6B, the sample points 607 in the subset 632 (of the set 630) are located at the boundary of reference line segments 611 and 612. The distance between the sets 620, 630, and 640 (e.g., the distance along the reference line 610) and the distance between subsets may be determined based on the speed of the ADV 605, as discussed above. Thus, there may be instances or situations where the speed of the ADV 605 may result in some sample points being located at the boundary of reference line segments. Because the sample points 607 of subset 632 are located at the boundary of reference line segments 611 and 612, the cost of the segments that lead to (e.g., end at) the sample points 607 in the subset 632 and the cost of the segments that originate from (e.g., start from) the sample points 607 in the subset 632 may cause those segments to be unusable by the path generator 404, as discussed above. Thus, the path generator 404 may be unable to determine a path for the ADV 605 using the segments that include the sample points 607 in the subset 632.

However, subset 631 is offset from subset 632 as illustrated in FIG. 6B. Because subset 631 is offset from subset 632, at least some of the sample points 607 in set 630 (e.g., the sample points 607 in subset 631) are not located at the boundary of reference line segments 611 and 612. This may allow the path generator 404 to determine a path for the ADV using the segments that include some of the sample points 607 in set 630 (e.g., the sample points 607 in the subset 631).

In one embodiment, the number of sample points in a set of sample points may not be increased. For example, referring to FIG. 5B, set 530 includes five sample points 507 and set 630 also includes five sample points 507. However, offsetting some of the sample points in the set 630 allows the path generator 404 to determine a path for the ADV 605 even though some of the points in the set 630 are located on at the boundary of reference line segments 611 and 612. Offsetting some of the sample points in the set 620, 630, and 640 may also allow the path generator 404 to avoid the issue where the path generator 404 is unable to determine a path because all of the sample points in a set are located at a boundary of two reference line segments. In addition, the path generator 404 may be able determine a path without using additional sample points or additional sets of sample points.

In one embodiment, offsetting some of the sample points in a set may allow the ADV to determine paths with different curvatures and different curvature change rates because the sample points are not located along at the same point along the reference line 610. For example, referring to FIG. 5B, all of the sample points in the 520 are located along a line that is perpendicular to the reference line 510. However, the sample points 607 in subset 621 are located along a first line that is perpendicular to the reference line 610 and the sample points 607 in the subset 622 are located along a second line that is perpendicular to the reference line 610. This may change the curvatures and/or curvature change rates at the sample points 607 which may allow for more or different options, variations, choices, etc., when the path generator 404 determines a path for the ADV.

Figure 7:
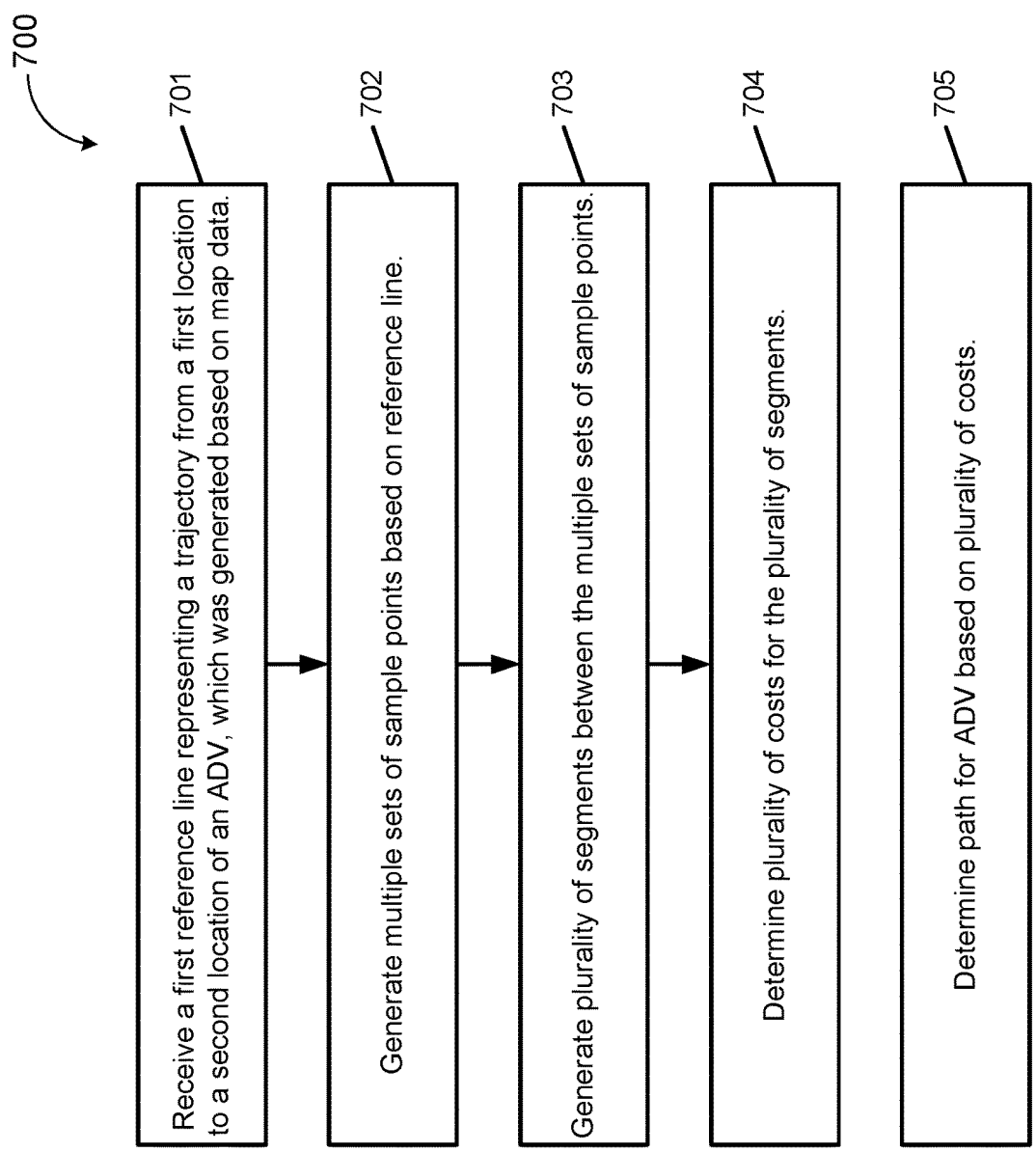
FIG. 7 is a flow diagram illustrating an example of process for determining a path for an autonomous vehicle according to some embodiments.

FIG. 7 is a flow diagram illustrating an example of process 700 for determining a path for an autonomous vehicle according to some embodiments. Process 700 may be performed by processing logic which may include software, hardware, or a combination thereof. Process 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 700 may be performed by planning module 305 illustrated in FIG. 3 and FIG. 4. Referring to FIG. 7, at block 701, processing logic receives a reference line that was generated based on map data. The first reference line may represent a trajectory from a first location to a second location along which an ADV may to follow. The processing logic may generate multiple sets of sample points based on the reference line at block 702. Each set may include multiple subsets of sample points. The subsets of sample points may be offset from each other, as discussed above. The distance between the sets and subsets of sample points may be based on the speed (e.g., velocity) of the ADV.

At block 703, the processing logic may generate a plurality of segments between the multiple sets of sample points. In one embodiment, the processing logic may connect each sample point in a set of sample points to each sample point in an adjacent set of sample points, as discussed above. In another embodiment, the processing logic may determine a plurality of polynomial functions (e.g., quantic or cubic polynomial functions) for the plurality of segments. For example, the processing logic may generate a polynomial function and determine the coefficients for the polynomial function, for each segment, as discussed above. The processing logic may determine a plurality of costs for the plurality of segments at block 704. For example, the processing logic may determine a cost (e.g., a weight) for each segment, as discussed above. The cost for each segment may be based on various factors or parameters including, but not limited to, how far away the segment is from the reference line, how far away the sample points in the segment are from the reference line, the curvature change rate for a segment or for sample points in the segment, the curvature of a segment, obstacles that may be located at a sample point, etc., as discussed above. At block 705, the processing logic may determine a path for the ADV based on the plurality of costs. For example, the processing logic may use dynamic programming algorithms, functions, etc., such as Dijkstra's algorithm to determine a cost that has the lowest total cost, as discussed above.

Note that some or all of the components as shown and described above may be implemented in software, hardware, or a combination thereof. For example, such components may be implemented as software installed and stored in a persistent storage device, which may be loaded and executed in a memory by a processor (not shown) to carry out the processes or operations described throughout this application. Alternatively, such components may be implemented as executable code programmed or embedded into dedicated hardware such as an integrated circuit (e.g., an application specific IC or ASIC), a digital signal processor (DSP), or a field programmable gate array (FPGA), which may be accessed via a corresponding driver and/or operating system from an application. Furthermore, such components may be implemented as specific hardware logic in a processor or processor core as part of an instruction set accessible by a software component via one or more specific instructions.

Figure 8:
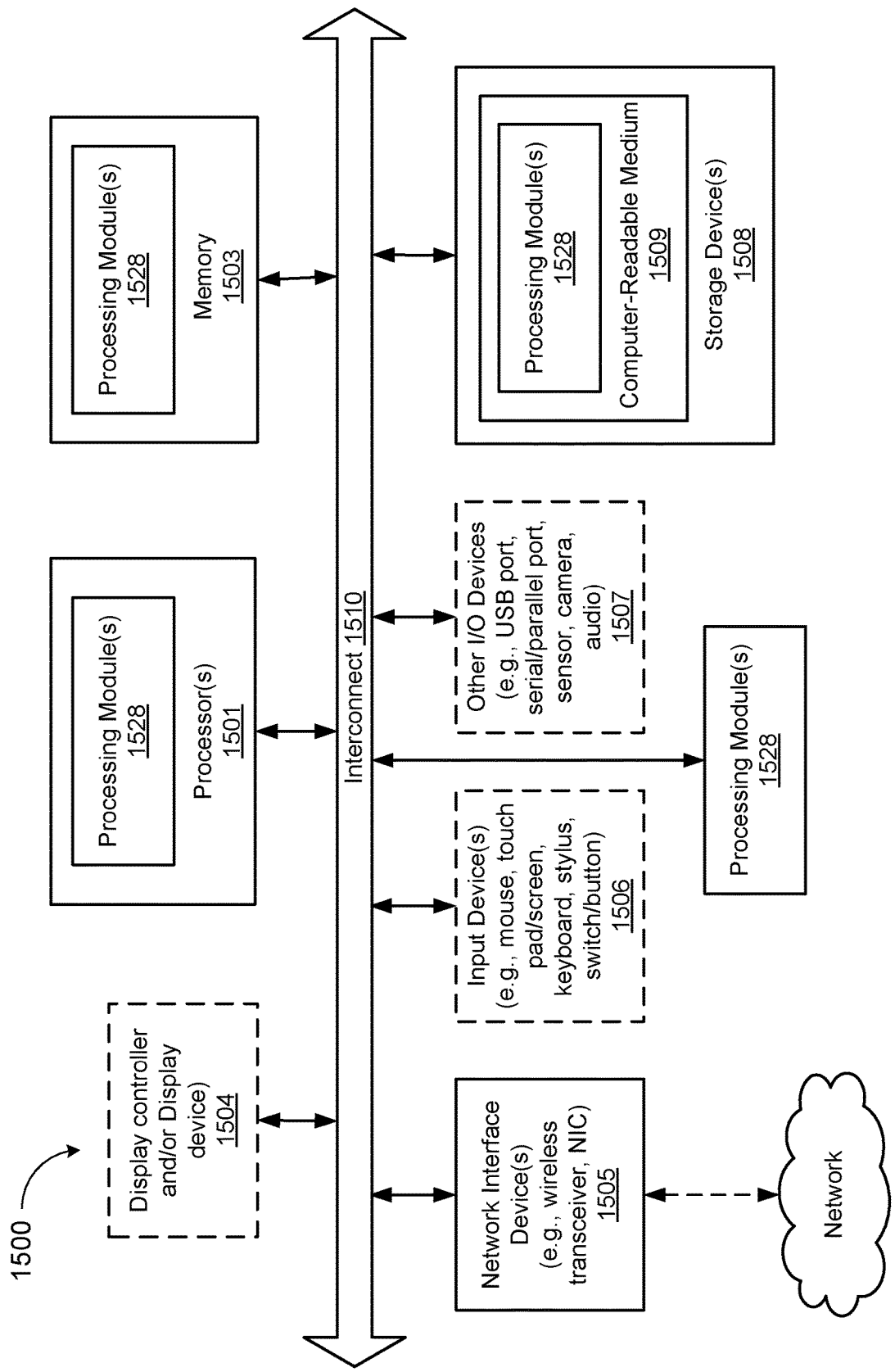
FIG. 8 is a block diagram illustrating a data processing system according to some embodiments.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components may be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor may be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment may be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications may be loaded in memory 1503 and executed by processor 1501. An operating system may be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein may be implemented as discrete hardware components or integrated in the functionality of hardware components such as ASICS, FPGAs, DSPs or similar devices. In addition, processing module/unit/logic 1528 may be implemented as firmware or functional circuitry within hardware devices. Further, processing module/unit/logic 1528 may be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method of operating an autonomous driving vehicle, the method comprising:
   in response to a first reference line representing a route from a first location to a second location associated with an autonomous driving vehicle (ADV), generating multiple sets of sample points based on the first reference line, wherein each set of sample points comprises a first subset of sample points and a second subset of sample points that are shifted to a right of the first subset of sample points along the first reference line, wherein generating the multiple sets of sample points comprises:
      determining a distance between each set of the multiple sets of sample points based on distance=(ADV_speed*speed_coefficient)+min_dist, wherein ADV_speed is a speed of the ADV, wherein speed_coefficient is a weight for the speed of the ADV, and wherein min_dist is a minimum distance between the multiple sets of sample points;
   generating a plurality of segments between the multiple sets of sample points;
   determining a path for the ADV based on the plurality of segments, wherein the path comprises one sample point from each of the multiple sets of sample points; and
   controlling the autonomous driving vehicle based on the path.

2. The method of claim 1, wherein generating the multiple sets of sample points comprises:
   determining a distance between each of the multiple sets of sample points based on the speed of the ADV.

3. The method of claim 1, wherein generating the multiple sets of sample points comprises:
   determining a distance between subsets of the multiple sets of sample points based on the speed of the ADV.

4. The method of claim 1, wherein a first number of sample points in the first subset of sample points is less than or equal to a second number of sample points in the second subset of sample points.

5. The method of claim 1, wherein a first spacing of the first subset is less than or equal to a second spacing of the second subset.

6. The method of claim 1, wherein generating the plurality of segments between the multiple sets of sample points comprises:
   connecting each sample point in a set of sample points to each sample point in an adjacent set of sample points.

7. The method of claim 1, wherein generating the plurality of segments between the multiple sets of sample points comprises:

determining a plurality of polynomial functions for the plurality of segments, wherein each polynomial function represents one segment of the plurality of segments.

8. The method of claim 7, wherein coefficients of each polynomial are determined based on one or more of a location of the ADV, a direction of the ADV, a curvature of the ADV, or a curvature change rate of the ADV associated with a respective segment.

9. The method of claim 7, wherein each polynomial function comprises at least one of a quintic polynomial function or a cubic polynomial function.

10. The method of claim 1, wherein determining the path for the ADV comprises:
   determining a plurality of costs for the plurality of segments; and
   determining the path based on the plurality of costs.

11. A non-transitory machine-readable medium having instructions stored therein, which when executed by a processor, cause the processor to perform operations, the operations comprising:
   in response to a first reference line representing a route from a first location to a second location associated with an autonomous driving vehicle (ADV), generating multiple sets of sample points based on the first reference line, wherein each set of sample points comprises a first subset of sample points and a second subset of sample points that are shifted to a right of the first subset of sample points along the first reference line, wherein generating the multiple sets of sample points comprises:
   determining a distance between each set of the multiple sets of sample points based on distance= (ADV_speed*speed_coefficient)+min_dist, wherein ADV_speed is a speed of the ADV, wherein speed_coefficient is a weight for the speed of the ADV, and wherein min_dist is a minimum distance between the multiple sets of sample points;
   generating a plurality of segments between the multiple sets of sample points;
   determining a path for the ADV based on the plurality of segments, wherein the path comprises one sample point from each of the multiple sets of sample points; and
   controlling the autonomous driving vehicle based on the path.

12. The non-transitory machine-readable medium of claim 11, wherein generating the multiple sets of sample points comprises:
   determining a distance between each of the multiple sets of sample points based on the speed of the ADV.

13. The non-transitory machine-readable medium of claim 11, wherein generating the multiple sets of sample points comprises:
   determining a distance between subsets of the multiple sets of sample points based on the speed of the ADV.

14. The non-transitory machine-readable medium of claim 11, wherein a first number of sample points in the first subset of sample points is less than or equal to a second number of sample points in the second subset of sample points.

15. The non-transitory machine-readable medium of claim 11, wherein a first spacing of the first subset is less than or equal to a second spacing of the second subset.

16. The non-transitory machine-readable medium of claim 11, wherein generating the plurality of segments between the multiple sets of sample points comprises:
   connecting each sample point in a set of sample points to each sample point in an adjacent set of sample points.

17. The non-transitory machine-readable medium of claim 11, wherein generating the plurality of segments between the multiple sets of sample points comprises:
   determining a plurality of polynomial functions for the plurality of segments, wherein each polynomial function represents one segment of the plurality of segments.

18. The non-transitory machine-readable medium of claim 17, wherein coefficients of each polynomial are determined based on one or more of a location of the ADV, a direction of the ADV, a curvature of the ADV, or a curvature change rate of the ADV associated with a respective segment.

19. The non-transitory machine-readable medium of claim 11, wherein determining the path for the ADV comprises:
   determining a plurality of costs for the plurality of segments; and
   determining the path based on the plurality of costs.

20. A data processing system, comprising:
   a processor; and
   a memory coupled to the processor to store instructions, which when executed by the processor, cause the processor to perform operations, the operations comprising:
   in response to a first reference line representing a route from a first location to a second location associated with an autonomous driving vehicle (ADV), generating multiple sets of sample points based on the first reference line, wherein each set of sample points comprises a first subset of sample points and a second subset of sample points that are shifted to a right of the first subset of sample points along the first reference line, wherein generating the multiple sets of sample points comprises:
   determining a distance between each set of the multiple sets of sample points based on distance= (ADV_speed*speed_coefficient)+min_dist, wherein ADV_speed is a speed of the ADV, wherein speed_coefficient is a weight for the speed of the ADV, and wherein min_dist is a minimum distance between the multiple sets of sample points;
   generating a plurality of segments between the multiple sets of sample points;
   determining a path for the ADV based on the plurality of segments, wherein the path comprises one sample point from each of the multiple sets of sample points; and
   controlling the autonomous driving vehicle based on the path.

* * * * *